(12) United States Patent
Cai et al.

(10) Patent No.: US 8,731,763 B2
(45) Date of Patent: May 20, 2014

(54) METHOD FOR CONTROLLING BATTERY REPLACEMENT BASED ON DISTANCE DATA AND SYSTEM THEREOF

(75) Inventors: Xin Cai, Zhejiang (CN); Quan Wang, Zhejiang (CN); Fan Zhang, Zhejiang (CN); Liang Nie, Zhejiang (CN); Zhengxian Zheng, Zhejiang (CN); Bo Li, Zhejiang (CN)

(73) Assignees: Hangzhou Electric Power Bureau, Zhejiang (CN); Hangzhou Da You Science Technology Development Co., Ltd., Zhejiang (CN)

( * ) Notice: Subject to any disclaimer, the term of this patent is extended or adjusted under 35 U.S.C. 154(b) by 0 days.

(21) Appl. No.: 13/516,918

(22) PCT Filed: Sep. 19, 2011

(86) PCT No.: PCT/CN2011/079808
§ 371 (c)(1),
(2), (4) Date: Jun. 18, 2012

(87) PCT Pub. No.: WO2012/100546
PCT Pub. Date: Aug. 2, 2012

(65) Prior Publication Data
US 2013/0304302 A1 Nov. 14, 2013

(30) Foreign Application Priority Data
Jan. 25, 2011 (CN) .......................... 2011 1 0027419

(51) Int. Cl.
*G01M 17/00* (2006.01)
*G01C 17/38* (2006.01)
*G06F 17/40* (2006.01)
*G01B 3/12* (2006.01)

(52) U.S. Cl.
USPC ........... 701/29.1; 701/527; 702/187; 702/165

(58) Field of Classification Search
USPC .................................. 701/29.1; 702/165, 187
See application file for complete search history.

(56) References Cited

U.S. PATENT DOCUMENTS

| 5,311,973 | A | * | 5/1994 | Tseng et al. | 191/10 |
| 5,479,085 | A | * | 12/1995 | Honda et al. | 320/134 |
| 6,114,834 | A | * | 9/2000 | Parise | 320/109 |

(Continued)

FOREIGN PATENT DOCUMENTS

EP 602432 A2 * 6/1994 ............ H01M 10/44

OTHER PUBLICATIONS

International Search Report and Written Opinion of the ISA (Chinese), mailed Dec. 22, 2011.

*Primary Examiner* — Thomas Black
*Assistant Examiner* — Tyler Paige
(74) *Attorney, Agent, or Firm* — Harness, Dickey & Pierce, P.L.C.

(57) ABSTRACT

A method for controlling battery replacement based on distance data and a system thereof are provided. The method includes: reading current distance data of an electric vehicle, wherein the current distance data indicates the total distance that the electric vehicle has traveled; receiving related recharge information for the electric vehicle submitted by a user, wherein the related recharge information includes a distance account, and the distance account indicates that the user currently adopts a billing policy in which the user is credited with a fixed amount of distance in a fixed period of time; and determining whether to perform an operation of replacing a battery of the electric vehicle according to the distance data and the billing policy. By using the present invention, distance data of an electric vehicle and distance account information can be obtained, and by using the distance data and the distance account information battery replacement can be controlled conveniently, which ensures continuous electricity provided for the green operation of the electric vehicle.

16 Claims, 3 Drawing Sheets

(56) References Cited

U.S. PATENT DOCUMENTS

| | | | |
|---|---|---|---|
| 2009/0058355 A1* | 3/2009 | Meyer | 320/104 |
| 2009/0177595 A1* | 7/2009 | Dunlap et al. | 705/412 |
| 2009/0256523 A1 | 10/2009 | Taguchi | |
| 2010/0017249 A1* | 1/2010 | Fincham et al. | 705/8 |
| 2010/0274690 A1* | 10/2010 | Tate, Jr. | 705/30 |
| 2012/0010894 A1* | 1/2012 | Jammer | 705/1.1 |
| 2012/0089286 A1* | 4/2012 | Nakata | 701/22 |
| 2012/0112696 A1* | 5/2012 | Ikeda et al. | 320/109 |

\* cited by examiner

METHOD FOR CONTROLLING BATTERY REPLACEMENT BASED ON DISTANCE DATA AND SYSTEM THEREOF

This application is a national stage application of PCT application PCT/CN2011/079808, filed on Sep. 19, 2011, titled "METHOD FOR CONTROLLING BATTERY REPLACEMENT BASED ON DISTANCE DATA AND SYSTEM THEREOF", which claimed priority to Chinese application No. 201110027419.2, filed on Jan. 25, 2011. Both the PCT application and the Chinese application are incorporated herein by reference in their entireties.

FIELD OF THE INVENTION

The present invention relates to the field of data processing, and particularly to a method for controlling battery replacement based on distance data and a system thereof.

BACKGROUND OF THE INVENTION

In a conventional electrical network, it is conventional electrical energy that is transmitted through conventional cables, and to use the electrical energy, one has to connect various cables to a corresponding electrical substation. An electric vehicle is a vehicle that is powered by an on-board power source, drives the wheels with an electric motor, and complies with road traffic and safety regulations. An electric vehicle does not directly emit harmful gases that contaminate the air; and even with its power consumption quantified into the emissions at the power plants, pollutants other than sulfur and particulate matter are significantly reduced. Therefore, power plants are generally away from populated cities in order to reduce the harm for humans, and since power plants are fixed in a location, it is easy to integrally emit and clean the various harmful pollutants.

However, for an electric vehicle, battery technology is especially important because it enables the electric vehicle's operation. Currently, the amount of energy stored in a storage battery per unit weight is little, and the batteries for an electric vehicle are relatively expensive and cannot benefit from economies of scale, hence, the purchase cost is relatively high; as to the use-cost, some testing results show that electric vehicles are higher a conventional vehicle, while others show that electric vehicles are as low as ⅓ of a conventional vehicle, mainly depending on the lifetime of the batteries and local gasoline and electricity prices.

Therefore, for electric vehicles, the biggest obstacle in their industrialization currently is infrastructure construction and price. As compared with a hybrid vehicle, an electric vehicle requires more on the supporting infrastructure, including recharge. However, there is no effective method in the prior art for controlling whether to replace the battery when an electric vehicle needs to be recharged, which solves the problem of how to control battery replacement based on distance data when an electric vehicle is to be recharged at a charging station.

In view of the forgoing, it is a technical problem to be solved to provide for an electric vehicle an effective and reliable method for controlling battery replacement based on distance data when the electric vehicle is to be recharged.

SUMMARY OF THE INVENTION

A technical problem to be solved by the present invention is to provide a method for controlling battery replacement based on distance data when an electric vehicle is to be recharged, which resolves the drawback in the prior art that there is no method for controlling battery replacement, and realizes effective and reliable control of recharging of the electric vehicle in its operation.

Another object of the present invention is to apply the idea above to a specific application scenario, and provide a system for controlling battery replacement based on distance data, thereby providing an implementation and application of the method.

To solve the technical problem above, according to an embodiment of the present invention, it is provided a method for controlling battery replacement based on distance data, including:

reading current distance data of an electric vehicle, wherein the current distance data indicates the total distance that the electric vehicle has traveled;

receiving related recharge information for the electric vehicle submitted by a user, wherein the related recharge information includes a distance account, and the distance account indicates that the user currently adopts a billing policy in which the user is credited with a fixed amount of distance in a fixed period of time; and determining whether to perform an operation of replacing a battery of the electric vehicle according to the distance data and the billing policy corresponding to the distance account.

Preferably, the related recharge information further includes information on whether the distance account is bound to an electric vehicle, and the determining whether to perform an operation of replacing a battery of the electric vehicle according to the distance data and the billing policy corresponding to the distance account includes:

determining whether the electric vehicle to be recharged currently is the electric vehicle bound to the distance account according to received electric vehicle identification information; and rejecting the operation of replacing a battery of the electric vehicle, if the electric vehicle to be recharged currently is not the electric vehicle bound to the distance account;

determining whether there is remaining distance in the distance account, if the electric vehicle to be recharged currently is the electric vehicle bound to the distance account; and allowing the operation of replacing a battery of the electric vehicle, if there is remaining distance in the distance account;

rejecting the operation of replacing a battery of the electric vehicle, if there is no remaining distance in the distance account.

Preferably, the determining whether the electric vehicle to be recharged currently is the electric vehicle bound to the distance account includes:

reading identification information on a battery concentrator of the electric vehicle; and comparing the identification information and information of the pre-bound electric vehicle; and determining that the electric vehicle to be recharged is the electric vehicle bound to the distance account, if the identification information is in accordance with the information of the pre-bound electric vehicle.

Preferably, the remaining distance is obtained by:

receiving the current distance data of the electric vehicle sent from an odometer of the electric vehicle; and calculating the difference between the fixed amount of distance corresponding to the electric vehicle and the current distance data of the electric vehicle, and determining the difference as the remaining distance.

Preferably, the receiving related recharge information for the electric vehicle submitted by a user includes:
  receiving, through a hand-held terminal, related recharge information for the electric vehicle input by a user to the hand-held terminal; or
  receiving, through a message sent by a mobile phone, related recharge information for the electric vehicle sent from a user.

According to an embodiment of the present invention, it is also provided a system for controlling battery replacement based on distance data, including:
  a distance data reading unit, adapted to read current distance data of an electric vehicle, wherein the current distance data indicates the total distance that the electric vehicle has traveled;
  a recharge information reception unit, adapted to receive related recharge information for the electric vehicle submitted by a user, wherein the related recharge information includes a distance account, and the distance account indicates that the user currently adopts a billing policy in which the user is credited with a fixed amount of distance in a fixed period of time; and
  a battery replacement controlling unit, adapted to determine whether to perform an operation of replacing a battery of the electric vehicle according to the current distance data and the billing policy corresponding to the distance account.

Preferably, the related recharge information further includes information on whether the distance account is bound to an electric vehicle, and the battery replacement controlling unit includes:
  a first determination module, adapted to determine whether the electric vehicle to be recharged currently is the electric vehicle bound to the distance account according to received electric vehicle identification information;
  an execution module, adapted to reject the operation of replacing a battery of the electric vehicle if the result of the first determination module is NO;
  a second determination module, adapted to determine whether there is remaining distance in the distance account if the result of the first determination module is YES; and
  a replacement allowing module, adapted to allow the operation of replacing a battery of the electric vehicle if there is remaining distance in the distance account,
  the execution module is further adapted to reject the operation of replacing a battery of the electric vehicle if there is no remaining distance in the distance account.

Preferably, the first determination module includes:
  a reading sub-module, adapted to read identification information on a battery concentrator of the electric vehicle; and
  a comparison module, adapted to compare the identification information and information of the pre-bound electric vehicle; and determine that the electric vehicle to be recharged is the electric vehicle bound to the distance account, if the identification information is in accordance with the information of the pre-bound electric vehicle.

Preferably, the system further includes:
  a distance data reception unit, adapted to receive the current distance data of the electric vehicle sent from an odometer of the electric vehicle; and
  a calculation unit, adapted to calculate the difference between the fixed amount of distance corresponding to the electric vehicle and the current distance data of the electric vehicle to be the remaining distance.

Preferably, the recharge information reception unit includes:
  a first reception sub-module, adapted to receive, through a hand-held terminal, related recharge information for the electric vehicle input by a user to the hand-held terminal; and
  a second reception sub-module, adapted to receive, through a message sent by a mobile phone, related recharge information for the electric vehicle sent from a user.

In comparison with the prior art, the present invention may bring the following advantages.

According to an embodiment of the present invention, current distance data of the electric vehicle is read, from an odometer in the electric vehicle, then, related recharge information for the electric vehicle is received, such as a distance account, therefore, it can be determined whether to perform the operation of replacing a battery of the current electric vehicle according to the obtained distance data and distance account, for example, allowing a battery replacement operation or rejecting a battery replacement operation. Therefore, the distance data of the electric vehicle and distance account information are obtained, and by using the distance data and the distance account information battery replacement can be controlled conveniently, which ensures continuous electricity provided for the green operation of the electric vehicle.

BRIEF DESCRIPTION OF THE DRAWINGS

For a better understating of the technical solutions according to the embodiments of the present invention and in the prior art, accompanying drawings used in the descriptions of the embodiments and the prior art are briefly described below. As a matter of course, the accompanying drawings represent only some of the embodiments of the present invention, and other drawings can be obtained by those skilled in the art based on these drawings without inventive effort.

DETAILED DESCRIPTION OF THE INVENTION

The above objects, features and advantages of the present invention will become more apparent when read in conjunction with the description of the embodiments and the accompanying drawings.

The present invention can be applied to numerous general-purpose or dedicated computing system environments or configurations, such as personal computers, server computers, hand-held devices or portable devices, tablet devices, multi-processor systems, and distributed computing environments that include any of the forgoing systems and devices.

The present invention may be described in a general context of computer-executable instructions executed by a computer, e.g., a program module. Generally, the program module may include a routine, program, object, component, data structure and the like that performs a specific task or implements a specific abstract data type. The present invention may also be implemented in a distributed computing environment, in which tasks are performed by remote processing devices connected through a communications network. In the distributed computing environment, the program module may be in a local or remote computer storage medium including a storage device.

Figure 1:
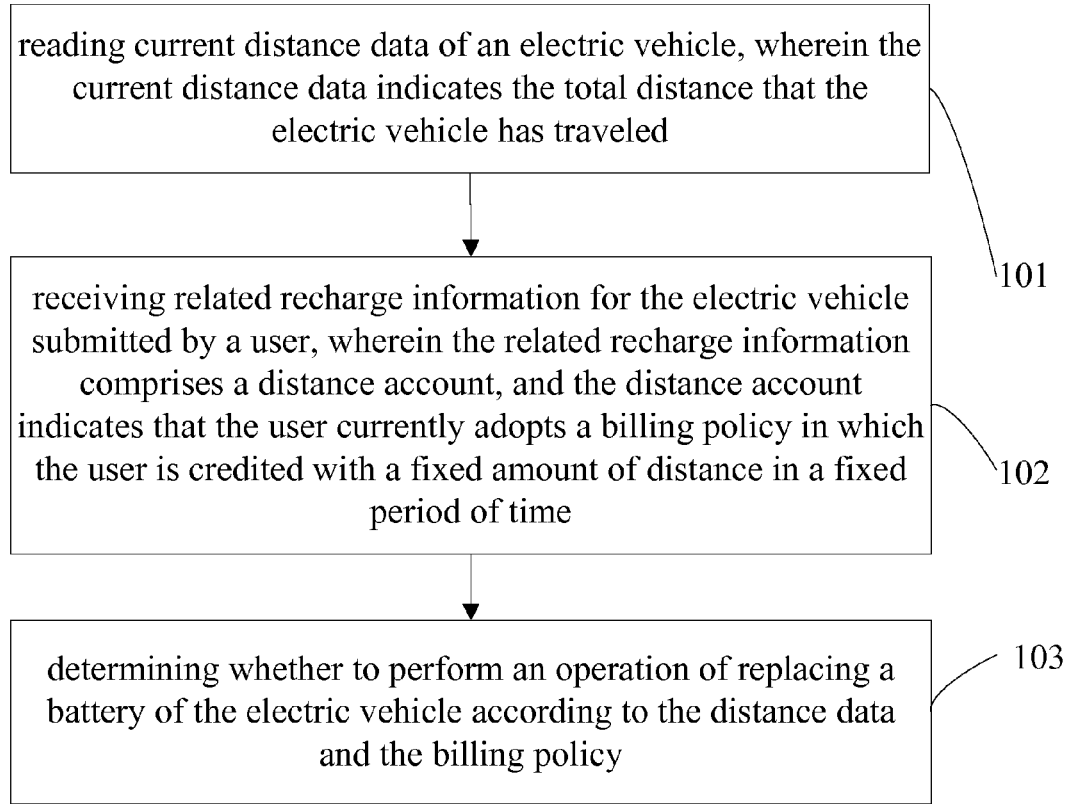
FIG. 1 is a flow chart of a first example of a method for controlling battery replacement based on distance data according to the present invention.

As shown in FIG. 1, a flow chart of a first example of a method for controlling battery replacement based on distance data according to the present invention, the method may include the following steps.

Step 101: current distance data of an electric vehicle is read, and the current distance data indicates the total distance that the electric vehicle has traveled.

In this step, the display data of a distance data collector installed in the electric vehicle may be obtained as the current distance data of the current electric vehicle. The current distance data indicates the total distance that the electric vehicle has traveled in the past. The distance data may be obtained in a number of ways, e.g., reading from the distance data collector by a wireless communication module in the electric vehicle, and then encrypting it and transmitting it in a wireless manner to a wireless transceiver having a certain power such that the distance data transmitted by the wireless communication module of the electric vehicle can be received when the electric vehicle is within a certain range from the wireless transceiver.

In an embodiment of the present invention, the user of the electric vehicle may have multiple user accounts. Each of the user accounts corresponds to a recharge card, and each recharge card is associated with a billing policy. For example, the user account may be a distance account. As a matter of course, the user account may also be an amount-of-electricity based billing account, or some other accounts that can be implemented. The distance account indicates that the user currently adopts a billing policy in which the user is credited with a fixed amount of distance in a fixed period of time. Specifically, the billing policy may include a plan specifying the amount of distance and a period of time, e.g., twenty thousand kilometers within one year. The amount-of-electricity based billing account indicates that the user currently adopts a billing policy in which the user is billed according to the amount of electricity for each recharge. It is noted that a user may have multiple user accounts.

A billing policy may be bound to a user account. Specifically, the user may preset a billing policy as needed and bind the billing policy to his or her recharge card that corresponds to a user account. It is noted that the recharge card associated with the billing policy used by a distance account is bound not only to a user account, but also to an electric vehicle. In other words, the recharge card specifying the amount of distance can only be used for recharging or replacing a battery of the electric vehicle bound to the card.

Therefore, in an embodiment of the present invention, for a user using a distance account (i.e., credited with a fixed amount of distance), the distance data can be used as a basis for the determination of whether to replace a battery. For a user adopting an amount-of-electricity based billing policy, the distance data is not used as a basis for the determination of whether to replace a battery; however, it may be stored as part of the data information of his or her use of the electric vehicle, therefore, reading the current distance data of the electric vehicle may still be a necessary step.

Step 102: related recharge information for the electric vehicle submitted by a user is received, and the related recharge information includes a distance account, and the distance account indicates that the user currently adopts a billing policy in which the user is credited with a fixed amount of distance in a fixed period of time.

In an embodiment of the present invention, the receiving related recharge information for the electric vehicle submitted by a user includes: receiving, through a hand-held terminal, related recharge information for the electric vehicle input by a user to the hand-held terminal.

When a user goes to a battery replacement station for the battery replacement of an electric vehicle, an operator with a hand-held terminal on his or her hand may ask the user to swipe a card on the hand-held terminal. The hand-held terminal may have a card reader module and a General packet radio service (GPRS) module. The card reader module is adapted to read information on the recharge card, and the GPRS module is adapted to communicate with a main station, for real-time billing. By swiping the card on the hand-held terminal, the billing policy for this time can be obtained, and electric vehicle identification information, balance information in the card and the like may be returned.

For a distance account, according to a distance balance and vehicle license plate information returned on the hand-held terminal, the operator identifies electric vehicle identification information and distance balance information and determines whether to replace a battery of the electric vehicle, and the system may record corresponding battery replacement information. For an amount-of-electricity based billing account, the operator determines whether to replace a battery of the electric vehicle according to whether the balance returned on the hand-held terminal is sufficient, and real-time billing may include replacing all four battery packs at once, e.g., for 20 Chinese Yuan, and deducting the fee in real time when the battery replacement is finished.

The system may be an electric vehicle energy supply operation system, and the battery replacement information may be recorded in a database. The recorded battery replacement information may include, for example, replacement success information of some of the battery packs, or information about which of the battery packs are replaced, or identification information of the electric vehicle whose battery is replaced, or time information of the battery replacement, to enable a better knowledge of the battery replacement situation by the operation system.

Alternatively, the receiving related recharge information for the electric vehicle submitted by a user may include: receiving, through a message sent by a mobile phone, related recharge information for the electric vehicle sent from a user.

This method may further include the user sending a recharge machine number and a request number to a service number by a mobile phone, and the system processing the content of the message sent in response to a requested operation.

Step 103: it is determined whether to perform an operation of replacing a battery of the electric vehicle according to the distance data and the billing policy corresponding to the distance account.

In an embodiment of the present invention, current distance data of the electric vehicle is read, from an odometer in the electric vehicle, then, related recharge information for the electric vehicle is received, such as a distance account, therefore, it can be determined whether to perform the operation of replacing a battery of the current electric vehicle according to the obtained distance data and distance account, for example, allowing a battery replacement operation or rejecting a battery replacement operation. Therefore, the distance data of the electric vehicle and distance account information are obtained, and by using the distance data and the distance account information battery replacement can be controlled conveniently, which ensures continuous electricity provided for the green operation of the electric vehicle.

Figure 2:
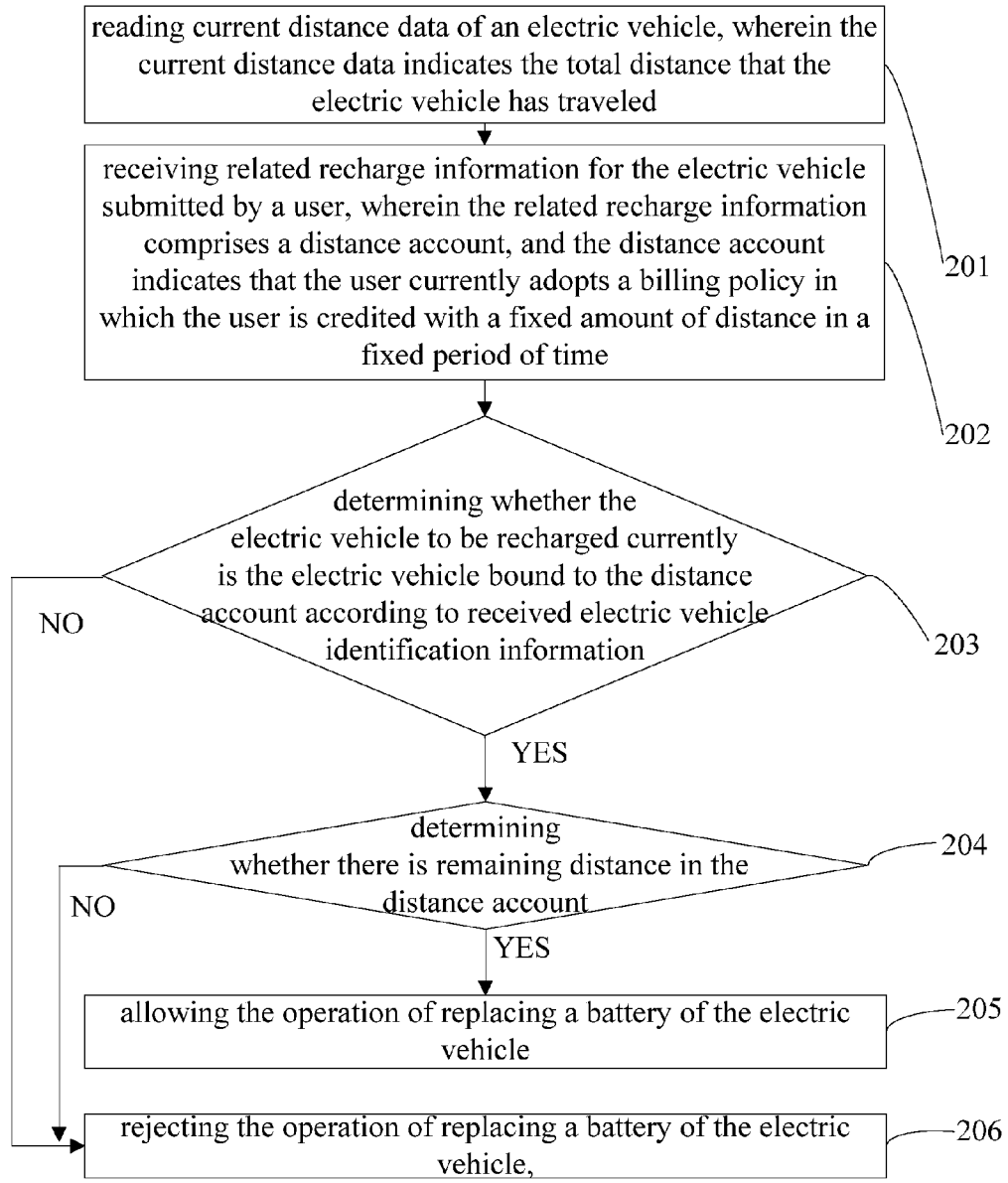
FIG. 2 is a flow chart of a second example of a method for controlling battery replacement based on distance data according to the present invention.

As shown in FIG. 2, a flow chart of a second example of a method for controlling battery replacement based on distance data according to the present invention, the method may include the following steps.

Step 201: current distance data of an electric vehicle is read, and the current distance data indicates the total distance that the electric vehicle has traveled.

Step 202: related recharge information for the electric vehicle submitted by a user is received, and the related recharge information includes a distance account, and the distance account indicates that the user currently adopts a billing policy in which the user is credited with a fixed amount of distance in a fixed period of time.

In an embodiment of the present invention, the user account is a distance account, and the recharge card corresponding to the distance account is bound to one or more electric vehicle; or, the user may bind his or her mobile phone number to an electric vehicle. In this way, according to an embodiment of the present invention, when the user uses the recharge card and the mobile phone number to recharge or replace a battery of an electric vehicle, the system can know whether it is the electric vehicle bound to the distance account and which the eclectic vehicle is. And if there is a certain electric vehicle bound to the distance account, then recharge or battery replacement is allowed only when the electric vehicle to be recharged or for battery replacement is bound to the recharge card or the mobile phone number; otherwise, recharge or battery replacement is not allowed.

Step 203: it is determined whether the electric vehicle to be recharged currently is the electric vehicle bound to the distance account according to received electric vehicle identification information; and if so, proceed to step 204; if not, proceed to step 206.

In an embodiment of the present invention, if a recharge card corresponding to a distance account is used by a user for recharge, determination of electric vehicle identification information and determination of distance balance may be included, to ensure that the distance balance is sufficient and the electric vehicle to be recharged is the electric vehicle bound to the distance account. In this step, the determination of whether the electric vehicle to be recharged is the electric vehicle bound to the distance account may be based on vehicle identification information, license plate information or the like.

It is noted that the determining whether the electric vehicle to be recharged currently is the electric vehicle bound to the distance account may include:

Step A1: identification information on a battery concentrator of the electric vehicle is read.

In this step, the identification information on the battery concentrator of the electric vehicle may be read, and then by comparing it with a corresponding vehicle in the system it is determined whether the electric vehicle is allowed this time.

Step A2: the identification information and information of the pre-bound electric vehicle are compared; and it is determined that the electric vehicle to be recharged is the electric vehicle bound to the distance account, if the identification information is in accordance with the information of the pre-bound electric vehicle.

Step 204: it continues to determine whether there is remaining distance in the distance account; and if so, proceed to step 205; if not, proceed to step 206.

In an embodiment of the present invention, each electric vehicle is installed with an odometer including a wireless transceiver module, for sending the current distance traveled periodically. When the vehicle enters a range covered by a distance data reading terminal with wireless transceiver function of a charging station (charging machine), the distance data reading terminal receives the distance data of the vehicle and reports it to a main station platform. The distance data reading terminal may be connected with a computer, which reports the distance data of the vehicle to the main station platform. The range covered by the distance data reading terminal may have a radius of 500 m, and in this range up to 50 vehicles may be allowed. The distance data reading terminal can receive the distance data of a vehicle parking in or entering the charging station (charging machine), and can also receive the distance data of a vehicle travelling at high speed (e.g., 80 Km/h) on the road nearby.

The distance data reading terminal may be implemented with an encryption chip, an odometer communication interface, a microcontroller (MCU) chip and a wireless radio frequency chip.

It is noted that the remaining distance may be obtained by:
calculating the difference between the fixed amount of distance corresponding to the electric vehicle and the current distance data of the electric vehicle, and determining the difference as the remaining distance.

In an embodiment of the present invention, the distance based billing mode includes the concept of remaining distance, because the service specifying the amount of distance includes a fixed value of the amount of distance, and by subtracting the distance that the vehicle has traveled from the fixed value, the remaining distance can be obtained. The remaining distance may be considered sufficient when the remaining distance is larger than 0.

Step 205: allowing the operation of replacing a battery of the electric vehicle.

Step 206: rejecting the operation of replacing a battery of the electric vehicle.

In the embodiments above, the procedure of how to determine whether to perform battery replacement or recharge of an electric vehicle for a distance account user is described.

It is noted that the various method embodiments above are described as a combination of steps for the purposes of simplicity, but those skilled in the art will appreciate that the present invention is not limited to the specific order in which the steps are described, because some of the steps may be performed in a different order or performed at the same time. Secondly, those skilled in the art will also appreciate that the embodiments described are preferred embodiments, and the steps and modules included may not be always essential for the implementation of the present invention.

In an embodiment of the present invention, if the user account is an amount-of-electricity based billing account, billing can be performed directly according to amount-of-electricity information obtained from the recharge card and a current electricity price rate, thereby facilitating battery replacement and recharge of an electric vehicle for a user using an amount-of-electricity based billing account.

Figure 3:
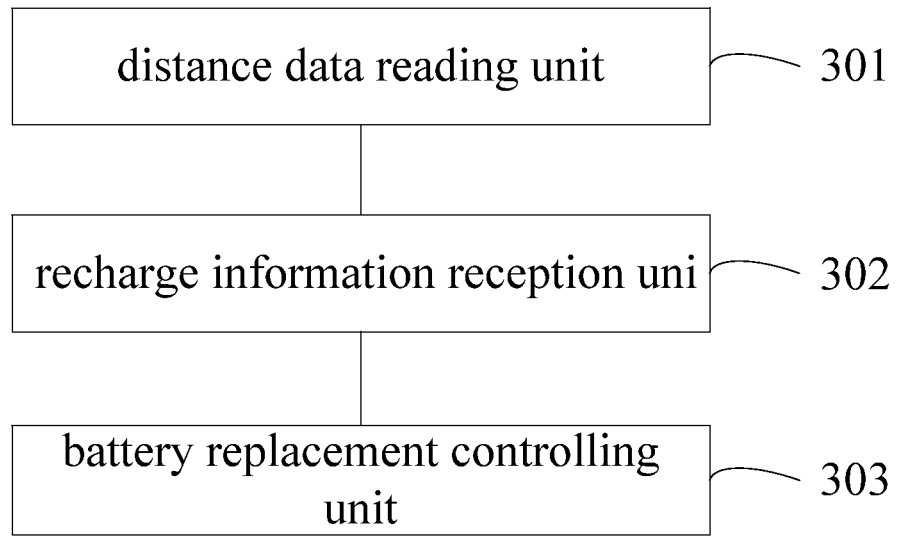
FIG. 3 is a schematic structural diagram of a first example of a system for controlling battery replacement based on distance data according to the present invention.

As shown in FIG. 3, a schematic structural diagram of a first example of a system for controlling battery replacement based on distance data according to the present invention, the system may include the following modules.

A distance data reading unit 301 is adapted to read current distance data of an electric vehicle, the current distance data indicating the total distance that the electric vehicle has traveled.

A recharge information reception unit 302 is adapted to receive related recharge information for the electric vehicle submitted by a user, the related recharge information including a distance account, and the distance account indicating that the user currently adopts a billing policy in which the user is credited with a fixed amount of distance in a fixed period of time.

In an embodiment of the present invention, the user of the electric vehicle may have multiple user accounts. Each of the user accounts corresponds to a recharge card, and each recharge card is associated with a billing policy. For example, the user account may be a distance account. As a matter of course, the user account may also be an amount-of-electricity based billing account, or some other accounts that can be implemented.

The distance account indicates that the user currently adopts a billing policy in which the user is credited with a fixed amount of distance in a fixed period of time. Specifically, the billing policy may include a plan specifying the amount of distance and a period of time, e.g., twenty thousand kilometers within one year. The amount-of-electricity based billing account indicates that the user currently adopts a billing policy in which the user is billed according to the amount of electricity for each recharge. It is noted that a user may have multiple user accounts.

A billing policy may be bound to a user account. Specifically, the user may preset a billing policy as needed and bind the billing policy to his or her recharge card that corresponds to a user account. It is noted that the recharge card associated with the billing policy used by a distance account is bound not only to a user account, but also to an electric vehicle. In other words, the recharge card specifying the amount of distance can only be used for recharging or replacing a battery of the electric vehicle bound to the card.

A battery replacement controlling unit 303 is adapted to determine whether to perform an operation of replacing a battery of the electric vehicle according to the current distance data and the billing policy corresponding to the distance account.

In an embodiment of the present invention, the received related recharge information includes a user account, and the user account includes but is not limited to: a distance account and an amount-of-electricity based billing account. The distance account indicates that the user currently adopts a billing policy in which the user is credited with a fixed amount of distance in a fixed period of time, and the amount-of-electricity based billing account that the user currently adopts a billing policy in which the user is billed according to the amount of electricity for each recharge; therefore, the user can select a billing policy, and can use different real-time billing methods according to the different billing policies when an electric vehicle is to be recharged, thus realizing effective and reliable real-time billing of the electric vehicle, and ensuring continuous electricity provided for the green operation of the electric vehicle.

Figure 4:
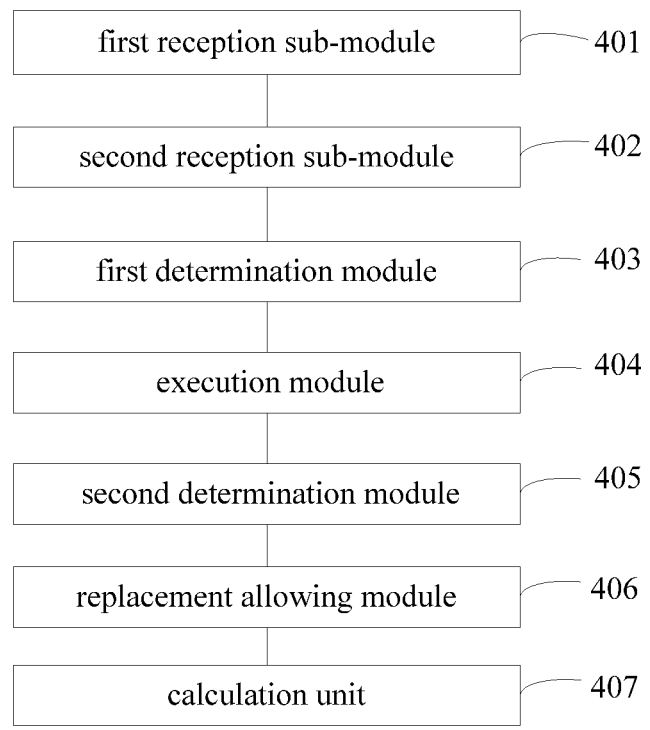
FIG. 4 is a schematic structural diagram of a second example of a system for controlling battery replacement based on distance data according to the present invention.

As shown in FIG. 4, a schematic structural diagram of a second example of a system for controlling battery replacement based on distance data according to the present invention, the recharge information reception unit 402 may include:

A first reception sub-module 401, receive, through a hand-held terminal, related recharge information for the electric vehicle input by a user to the hand-held terminal, wherein the related recharge information includes a user account, and when the user account is an amount-of-electricity based billing account, the related recharge information further includes the amount of electricity to be charged and the remaining amount of electricity; and A second reception sub-module 402, adapted to receive, through a message sent by a mobile phone, related recharge information for the electric vehicle sent from a user.

In an embodiment of the present invention, the related recharge information further includes information on whether the distance account is bound to an electric vehicle.

The battery replacement controlling unit may include:

A first determination module 403 adapted to determine whether the electric vehicle to be recharged currently is the electric vehicle bound to the distance account according to received electric vehicle identification information;

An execution module 404 adapted to reject the operation of replacing a battery of the electric vehicle if the result of the first determination module is NO;

A second determination module 405 adapted to determine whether there is remaining distance in the distance account if the result of the first determination module is YES; and A replacement allowing module 406 adapted to allow the operation of replacing a battery of the electric vehicle if there is remaining distance in the distance account.

The execution module 404 is further adapted to reject the operation of replacing a battery of the electric vehicle if there is no remaining distance in the distance account.

The first determination module 403 may include:

A reading sub-module adapted to read identification information on a battery concentrator of the electric vehicle;

A comparison module adapted to compare the identification information and information of the pre-bound electric vehicle; and determine that the electric vehicle to be recharged is the electric vehicle bound to the distance account, if the identification information is in accordance with the information of the pre-bound electric vehicle.

The system may further include:

A calculation unit 407 adapted to calculate the difference between the fixed amount of distance corresponding to the electric vehicle and the current distance data of the electric vehicle to be the remaining distance.

It is noted that in the present specification, the embodiments herein are described in a progressive manner, with each embodiment focused on its difference aspect from the other embodiments; hence, for the same or similar parts, please refer to the other embodiments. For the system embodiments, the description is relatively simple for its similarity to the method embodiments, please refer to the description of the method embodiments for the relating parts.

It is noted that in the present invention, the relational terms such as first and second are used merely for distinguishing one entity or operation from another, without requiring or implying an actual relationship or order between the entities or operations. Moreover, the terms "include", "comprise" and any other variants of them are inclusive, and do not exclude additional, unrecited elements of a process, method, product, apparatus or device, as well as those elements that are inherently included by the process, method, product, apparatus or device. Without further limitations, the wording "including an" element does not exclude the possibility of the same elements present in the process, method, product, apparatus or device including the element.

A method for controlling battery replacement based on distance data and a system for controlling battery replacement based on distance data provided by the present invention are described in detail above. Specific embodiments are described herein for illustrative purposes only, and the description of the embodiments are merely for a better understanding of the principle and idea of the present invention. Moreover, modifications may be made to the specific embodiments and applications by those skilled in the art according to the idea of the present invention. Therefore, the content of the description shall not be interpreted as limiting the scope of the present invention.

The invention claimed is:

1. A method for controlling battery replacement based on distance data, comprising:
   reading current distance data of an electric vehicle, wherein the current distance data indicates a total distance that the electric vehicle has traveled;
   receiving related recharge information for the electric vehicle submitted by a user, wherein the related recharge information comprises a distance account, and the distance account indicates that the user currently adopts a billing policy in which the user is credited with a fixed amount of distance in a fixed period of time; and
   determining whether to perform an operation of replacing a battery of the electric vehicle according to the distance data and the billing policy.

2. The method according to claim 1, wherein the related recharge information further comprises information on whether the distance account is bound to an electric vehicle, and wherein the determining whether to perform an operation of replacing a battery of the electric vehicle according to the distance data and the billing policy comprises:
   determining whether the electric vehicle to be recharged currently is the electric vehicle bound to the distance account according to received electric vehicle identification information;
   rejecting the operation of replacing a battery of the electric vehicle to be recharged currently, if the electric vehicle to be recharged currently is not the electric vehicle bound to the distance account;
   determining whether there is remaining distance in the distance account, if the electric vehicle to be recharged currently is the electric vehicle bound to the distance account;
   allowing the operation of replacing a battery of the electric vehicle to be recharged currently, if there is remaining distance in the distance account; and
   rejecting the operation of replacing a battery of the electric vehicle to be recharged currently, if there is no remaining distance in the distance account.

3. The method according to claim 2, wherein the determining whether the electric vehicle to be recharged currently is the electric vehicle bound to the distance account comprises:
   reading identification information on a battery concentrator of the electric vehicle to be recharged currently;
   comparing the identification information and information of a pre-bound electric vehicle; and
   determining that the electric vehicle to be recharged currently is the electric vehicle bound to the distance account, if the identification information is in accordance with the information of the pre-bound electric vehicle.

4. The method according to claim 2, wherein the remaining distance is obtained by:
   calculating a difference between the fixed amount of distance corresponding to the electric vehicle and the current distance data of the electric vehicle, and determining the difference as the remaining distance.

5. The method according to claim 1 wherein the receiving related recharge information for the electric vehicle submitted by a user comprises:
   receiving, through a hand-held terminal, the related recharge information for the electric vehicle input by a user to the hand-held terminal; or
   receiving, through a message sent by a mobile phone, the related recharge information for the electric vehicle from a user.

6. A system for controlling battery replacement based on distance data, comprising:
   a distance data reading unit, adapted to read current distance data of an electric vehicle, wherein the current distance data indicates a total distance that the electric vehicle has traveled;
   a recharge information reception unit, adapted to receive related recharge information for the electric vehicle submitted by a user, wherein the related recharge information comprises a distance account, and the distance account indicates that the user currently adopts a billing policy in which the user is credited with a fixed amount of distance in a fixed period of time; and
   a battery replacement controlling unit, adapted to determine whether to perform an operation of replacing a battery of the electric vehicle according to the current distance data and the billing policy.

7. The system according to claim 6, wherein the related recharge information further comprises information on whether the distance account is bound to an electric vehicle, and wherein the battery replacement controlling unit comprises:
   a first determination module, adapted to determine whether the electric vehicle to be recharged currently is the electric vehicle bound to the distance account according to received electric vehicle identification information;
   an execution module, adapted to reject the operation of replacing a battery of the electric vehicle to be recharged currently if a result from the first determination module is NO;
   a second determination module, adapted to determine whether there is remaining distance in the distance account if the result from the first determination module is YES; and
   a replacement allowing module, adapted to allow the operation of replacing a battery of the electric vehicle to be recharged currently if there is remaining distance in the distance account,
   wherein the execution module is further adapted to reject the operation of replacing a battery of the electric vehicle to be recharged currently if there is no remaining distance in the distance account.

8. The system according to claim 7, wherein the first determination module comprises:
   a reading sub-module, adapted to read identification information on a battery concentrator of the electric vehicle to be recharged currently; and
   a comparison module, adapted to compare the identification information and information of a pre-bound electric vehicle; and determine that the electric vehicle to be recharged currently is the electric vehicle bound to the distance account, if the identification information is in accordance with the information of the pre-bound electric vehicle.

9. The system according to claim 7, wherein the system further comprises:
   a calculation unit, adapted to calculate a difference between the fixed amount of distance corresponding to the electric vehicle and the current distance data of the electric vehicle, and determine the difference as the remaining distance.

10. The system according to claim 6 wherein the recharge information reception unit comprises:
    a first reception sub-module, adapted to receive, through a hand-held terminal, the related recharge information for the electric vehicle input by a user to the hand-held terminal; and a second reception sub-module, adapted to receive, through a message sent by a mobile phone, the related recharge information for the electric vehicle from a user.

11. The method according to claim 2, wherein the receiving related recharge information for the electric vehicle submitted by a user comprises:
   receiving, through a hand-held terminal, the related recharge information for the electric vehicle input by a user to the hand-held terminal; or
   receiving, through a message sent by a mobile phone, the related recharge information for the electric vehicle from a user.

12. The method according to claim 3, wherein the receiving related recharge information for the electric vehicle submitted by a user comprises:
   receiving, through a hand-held terminal, the related recharge information for the electric vehicle input by a user to the hand-held terminal; or
   receiving, through a message sent by a mobile phone, the related recharge information for the electric vehicle from a user.

13. The method according to claim 4, wherein the receiving related recharge information for the electric vehicle submitted by a user comprises:
   receiving, through a hand-held terminal, the related recharge information for the electric vehicle input by a user to the hand-held terminal; or
   receiving, through a message sent by a mobile phone, the related recharge information for the electric vehicle from a user.

14. The system according to claim 7, wherein the recharge information reception unit comprises:
   a first reception sub-module, adapted to receive, through a hand-held terminal, the related recharge information for the electric vehicle input by a user to the hand-held terminal; and
   a second reception sub-module, adapted to receive, through a message sent by a mobile phone, the related recharge information for the electric vehicle from a user.

15. The system according to claim 8, wherein the recharge information reception unit comprises:
   a first reception sub-module, adapted to receive, through a hand-held terminal, the related recharge information for the electric vehicle input by a user to the hand-held terminal; and
   a second reception sub-module, adapted to receive, through a message sent by a mobile phone, the related recharge information for the electric vehicle from a user.

16. The system according to claim 9, wherein the recharge information reception unit comprises:
   a first reception sub-module, adapted to receive, through a hand-held terminal, the related recharge information for the electric vehicle input by a user to the hand-held terminal; and
   a second reception sub-module, adapted to receive, through a message sent by a mobile phone, the related recharge information for the electric vehicle from a user.

\* \* \* \* \*